United States Patent
Liu et al.

(10) Patent No.: US 12,067,243 B2
(45) Date of Patent: Aug. 20, 2024

(54) METHOD AND DEVICE OF PROCESSING READ/WRITE REQUEST

(71) Applicant: Dell Products L.P., Round Rock, TX (US)

(72) Inventors: Wenyang Liu, Beijing (CN); Ying Tian, Beijing (CN); Dapeng Chi, Beijing (CN); Yang Song, Beijing (CN); Wen Jiang, Beijing (CN)

(73) Assignee: Dell Products L.P., Round Rock, TX (US)

(*) Notice: Subject to any disclaimer, the term of this patent is extended or adjusted under 35 U.S.C. 154(b) by 34 days.

(21) Appl. No.: 17/979,901

(22) Filed: Nov. 3, 2022

(65) Prior Publication Data

US 2023/0333743 A1    Oct. 19, 2023

(30) Foreign Application Priority Data

Apr. 15, 2022   (CN) .......................... 202210399120.8

(51) Int. Cl.
   *G06F 3/06*    (2006.01)
(52) U.S. Cl.
   CPC .......... *G06F 3/0611* (2013.01); *G06F 3/0604* (2013.01); *G06F 3/0634* (2013.01); *G06F 3/0683* (2013.01)
(58) Field of Classification Search
   CPC .. G06G 3/0611; G06G 3/0504; G06G 3/0634; G06G 3/0683; G06G 3/065; G06G 3/0689; G06G 3/0659
   See application file for complete search history.

(56) References Cited

U.S. PATENT DOCUMENTS

| | | | |
|---|---|---|---|
| 9,940,033 B1* | 4/2018 | Alshawabkeh | ....... G06F 3/0653 |
| 11,163,451 B1 | 11/2021 | Dalmatov et al. | |
| 11,163,454 B1 | 11/2021 | Dalmatov et al. | |
| 11,561,700 B2 | 1/2023 | Dar et al. | |
| 11,579,800 B2 | 2/2023 | Danilov et al. | |
| 2004/0133707 A1* | 7/2004 | Yoshiya | ................ G06F 3/0689 710/36 |
| 2013/0339599 A1* | 12/2013 | Sundrani | ............... G06F 3/0659 711/E12.001 |
| 2020/0334163 A1* | 10/2020 | Shergill | .............. G06F 11/3409 |
| 2020/0409878 A1* | 12/2020 | Liu | ..................... G06F 13/1668 |
| 2022/0229560 A1 | 7/2022 | Dar et al. | |
| 2022/0350513 A1 | 11/2022 | Dar et al. | |

* cited by examiner

*Primary Examiner* — Khoa D Doan
(74) *Attorney, Agent, or Firm* — BainwoodHuang

(57) ABSTRACT

Techniques for processing read/write requests involve determining an average response time for read/write requests to a storage device within a predetermined time period, and comparing the average response time with at least one predetermined threshold. Such techniques further involve adjusting a read/write request upper limit of the storage device based on the comparison between the average response time and the at least one predetermined threshold. Here, the read/write request upper limit indicates the maximum number of read/write requests in a read/write request queue for the storage device. In this way, the read/write request upper limit of a storage device may be dynamically adjusted based on a current response time of the storage device for processing read/write requests, and slow read/write processing caused by the accumulation of read/write requests at one storage device can be avoided.

20 Claims, 5 Drawing Sheets

METHOD AND DEVICE OF PROCESSING READ/WRITE REQUEST

CROSS-REFERENCE TO RELATED APPLICATION

This application claims priority to Chinese Patent Application No. CN202210399120.8, on file at the China National Intellectual Property Administration (CNIPA), having a filing date of Apr. 15, 2022, and having "METHOD AND DEVICE OF PROCESSING READ AND WRITE REQUEST" as a title, the contents and teachings of which are herein incorporated by reference in their entirety.

TECHNICAL FIELD

Embodiments of the present disclosure relate to the field of data storage, and more particularly relate to a method and a device of processing read/write requests.

BACKGROUND

In the field of storage technologies, a mapped redundant array of independent disks (Mapped RAID) is used in a dynamic storage pool. In order to provide the Mapped RAID technology, multiple disks are organized into a Disk Partner Group (DPG). Then, the disks are divided into extents based on a certain storage unit (e.g., Gb). Extents of different disks in the DPG are selected through a specific algorithm to create a RAID extent, which may also be regarded as a small conventional RAID. Multiple RAID extents are sequentially combined together to construct a Mapped RAID extent group. A Logical Unit Number (LUN) is created on each Mapped RAID group. Through a special allocation strategy and an address mapping mechanism between the LUN and the Mapped RAID group, input/output (I/O) requests to the LUN can be distributed evenly across all disks in the same DPG.

SUMMARY OF THE INVENTION

Embodiments of the present disclosure provide a solution for processing read/write requests based on a response time.

In a first aspect of the present disclosure, a method of processing read/write requests is provided. The method includes determining an average response time for read/write requests to a storage device within a predetermined time period. The method further includes comparing the average response time with at least one predetermined threshold. Finally, the method includes adjusting a read/write request upper limit of the storage device based on the comparison between the average response time and the at least one predetermined threshold. Here, the read/write request upper limit indicates the maximum number of read/write requests in a read/write request queue for the storage device.

In a second aspect of the present disclosure, an electronic device is provided. The electronic device includes a processor; and a memory coupled to the processor. The memory has instructions stored therein, and the instructions, when executed by the processor, cause the device to execute actions. The actions include determining an average response time for read/write requests to a storage device within a predetermined time period. The actions further include comparing the average response time with at least one predetermined threshold. Finally, the actions include adjusting a read/write request upper limit of the storage device based on the comparison between the average response time and the at least one predetermined threshold. Here, the read/write request upper limit indicates the maximum number of read/write requests in a read/write request queue for the storage device.

In a third aspect of the present disclosure, a computer program product is provided. The computer program product is tangibly stored on a computer-readable medium and includes machine-executable instructions. The machine-executable instructions, when executed, cause a machine to perform the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principle of the present disclosure will be described below with reference to several example embodiments illustrated in the accompanying drawings. Although the drawings show preferred embodiments of the present disclosure, it should be understood that these embodiments are merely described to enable those skilled in the art to better understand and further implement the present disclosure, and not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Figure 1:
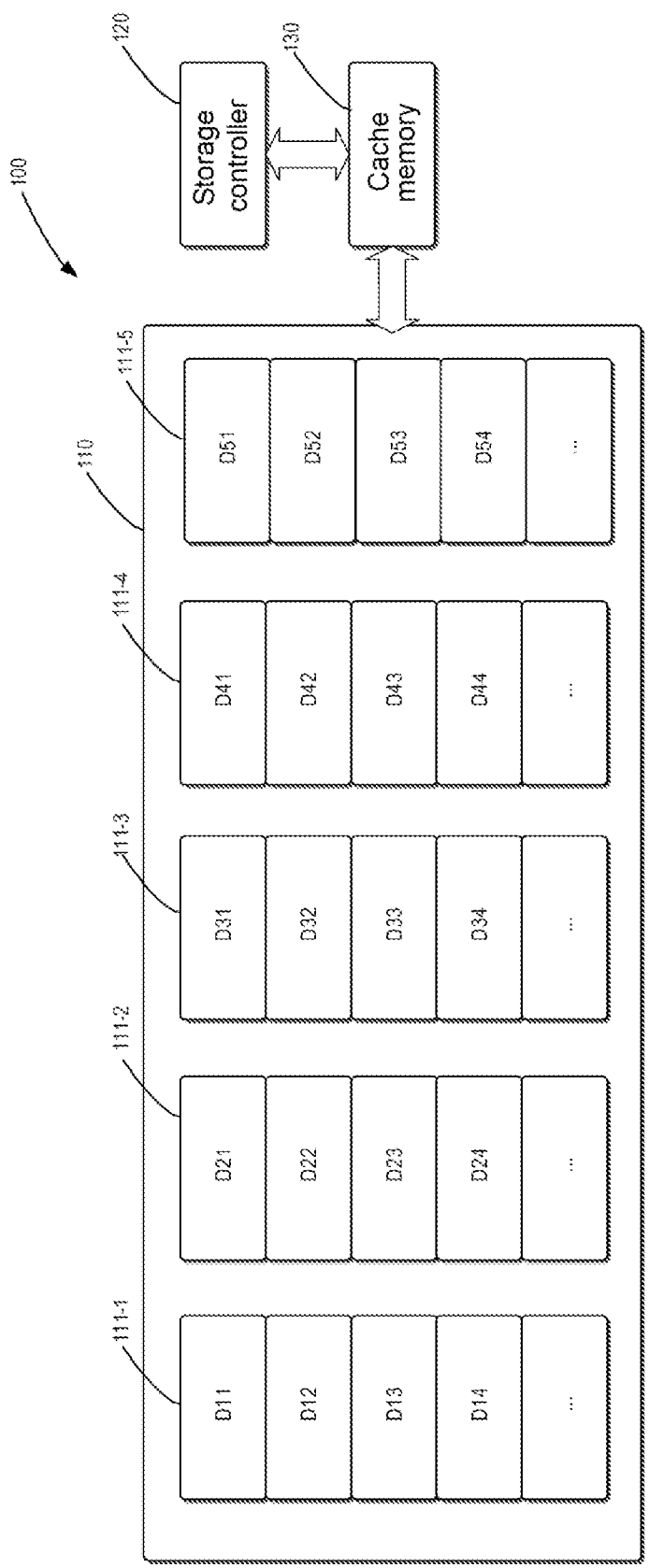
FIG. 1 illustrates a schematic diagram of a storage system in which an embodiment of the present disclosure can be implemented.

FIG. 1 illustrates a schematic diagram of storage system 100 in which an embodiment of the present disclosure can be implemented. Storage system 100 includes storage device group 110, such as the DPG as described above, which is used for providing data storage capabilities. Storage device group 110 includes multiple storage devices 111, including storage device 111-1, storage device 111-2, storage device 111-3, storage device 111-4, and storage device 111-5 (collectively or individually referred to as storage device 111). Storage device 111 is used for persistent storage of data. Storage system 100 may utilize multiple storage technologies to provide data storage capabilities. Each storage device includes multiple extents. For example, storage device 111-1 includes extent D11, extent D12, extent D13, extent D14, and the like. The extents in the storage device can be organized into a Mapped RAID group.

In some embodiments, examples of cache memory 130 include a memory having a high access speed, such as a cache, a random access memory (RAM), and a dynamic random access memory (DRAM). Examples of storage device 111 may include, but are not limited to, a digital versatile disc (DVD), a blue-ray disc (BD), a compact disc (CD), a floppy disk, a hard disk device, a tape drive, an optical drive, a hard disk device drive (HDD), a solid storage device (SSD), a redundant array of independent disks (RAID), or other hard disk devices.

Storage system 100 also includes storage controller 120 in order to control I/O requests to one storage device. The I/O requests may include, for example, read requests, write requests, delete requests, or the like, to implement writing, reading, and deletion of data in the storage system, and may also be referred to as read/write requests.

Conventionally, I/O request flow control for storage device group 110 includes two levels of flow control:

Level 1 flow control is overall flow control for entire storage device group 110, where entire storage device group 110 is set to indicate the maximum number of I/O requests to be processed, which is also referred to as a read/write request upper limit of the storage device group; and Level 2 is flow control for each single disk, where single disk 111 is set to indicate the maximum number of I/O requests to be processed, which is also referred to as a read/write request upper limit of the storage device.

In a control process, when I/O requests are sent to storage device group 110, storage controller 120 firstly checks, based on the I/O request processing upper limit of entire storage device group 110, whether storage device group 110 has an allowance to process these I/O requests. If the processing can be achieved, an I/O request control flow may be continued; otherwise, the I/O requests will be returned to cache memory 130. When I/O requests continue, storage controller 120 checks, based on the read/write request upper limit of a storage device of target storage device 111, whether target storage device 111 has an allowance to process allocated I/O requests. If it has the allowance, the I/O requests will be sent to a target disk; otherwise, the I/O requests will be returned to cache memory 130.

It should be understood that storage controller 120 may be implemented by a single or multiple processors, controllers, microprocessors, etc. having processing capabilities, or a computing device including these devices.

Conventionally, in an I/O request flow control mechanism for current storage device group 110, each storage device 111 will be set with a fixed I/O request upper limit according to the device type. For example, for a solid-state drive (SSD), the I/O request upper limit may be 120, while for a mechanical hard disk (HDD), the I/O request upper limit may be 80.

However, when the I/O request upper limit is a fixed value, the problem of slow I/O request processing often occurs. In this case, although the response to I/O requests of storage device 111 with slow processing is getting slower, the storage device with slower processing will still receive new I/O requests because the I/O request upper limit has not been reached. As a result, I/O requests accumulate at storage device 111, causing the I/O response time to become longer and longer. Therefore, it is desirable to manage an I/O request flow more efficiently so as to improve the performance of I/O request processing.

The embodiments of the present disclosure propose a solution for processing read/write requests based on a response time to solve one or more of the above problems and other potential problems. In this solution, by dynamically adjusting a read/write request upper limit of a storage device based on a response time for read/write requests, the storage device can receive fewer read/write requests when the processing speed is low and receive more read/write requests when the processing speed is high, so that the slow read/write speed caused by the accumulation of read/write requests is avoided, and the processing efficiency of read/write requests is improved. In this way, the read/write processing performance of a storage system can be improved, thereby improving the I/O performance.

Figure 2:
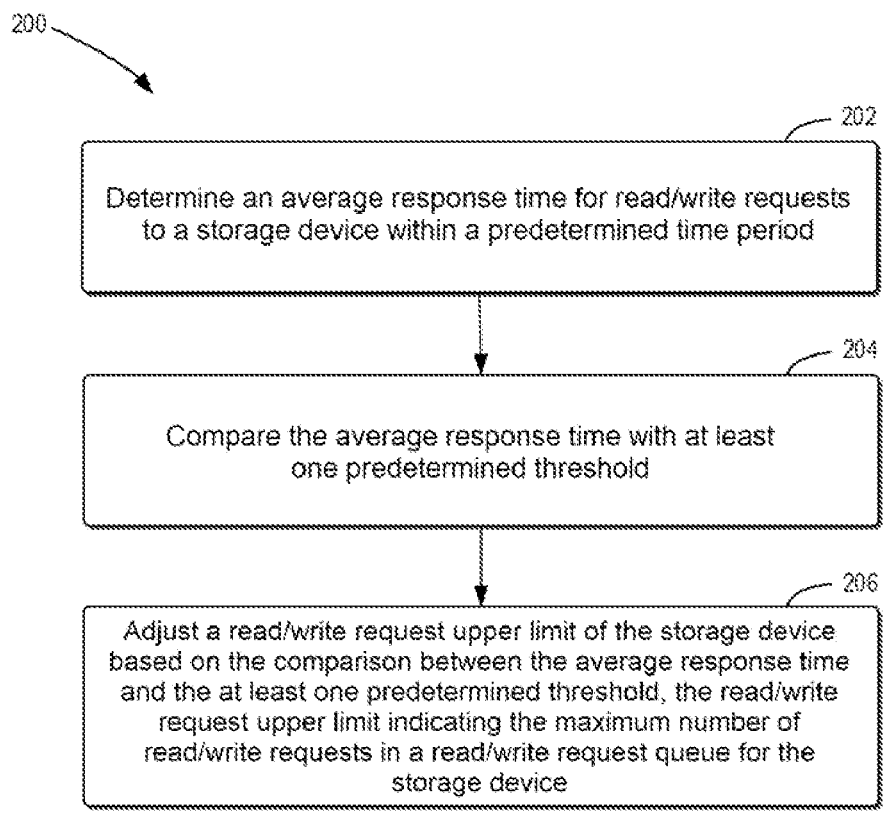
FIG. 2 illustrates a flow chart of an example method of processing read/write requests according to an embodiment of the present disclosure.

Example embodiments of the present disclosure will be described in detail below with reference to FIG. 2 to FIG. 4. FIG. 2 illustrates a schematic diagram of a data structure of storage system 100 according to some embodiments of the present disclosure.

FIG. 2 illustrates a flow chart of method 200 of processing read/write requests according to an embodiment of the present disclosure. Method 200 may be implemented, for example, by storage controller 120 as shown in FIG. 1.

At 202, storage controller 120 determines an average response time for read/write requests to storage device 111 within a predetermined time period. In some embodiments, the response time for a read/write request is a time period from the receipt of the read-write request by storage device 111 to the completion of execution of the read-write request. In some embodiments, the average response time for read/write requests may be determined based on the number of read/write requests completed by storage device 111 within a predetermined time period and the total time taken to complete these read/write requests. For example, the average response time can be obtained by the following formula:

$$AvgRT = T/S \qquad (1)$$

where AvgRT represents the average response time of storage device 111 in predetermined time period I; T represents the cumulative time of all read/write requests processed by storage device 111 within predetermined time period I; and S represents the number of all read/write requests processed by storage device 111 within predetermined time period I.

At 204, storage controller 120 compares the average response time with at least one predetermined threshold. In some embodiments, the predetermined threshold may be determined based on the storage device type. In some embodiments, the predetermined threshold may be determined based on the average response time of storage device 111 or each storage device 111 in storage device group 110. The predetermined threshold may be, for example, a multiple of the average response time. An example method for determining a predetermined threshold will be described in detail below with reference to FIG. 3.

Figure 3:
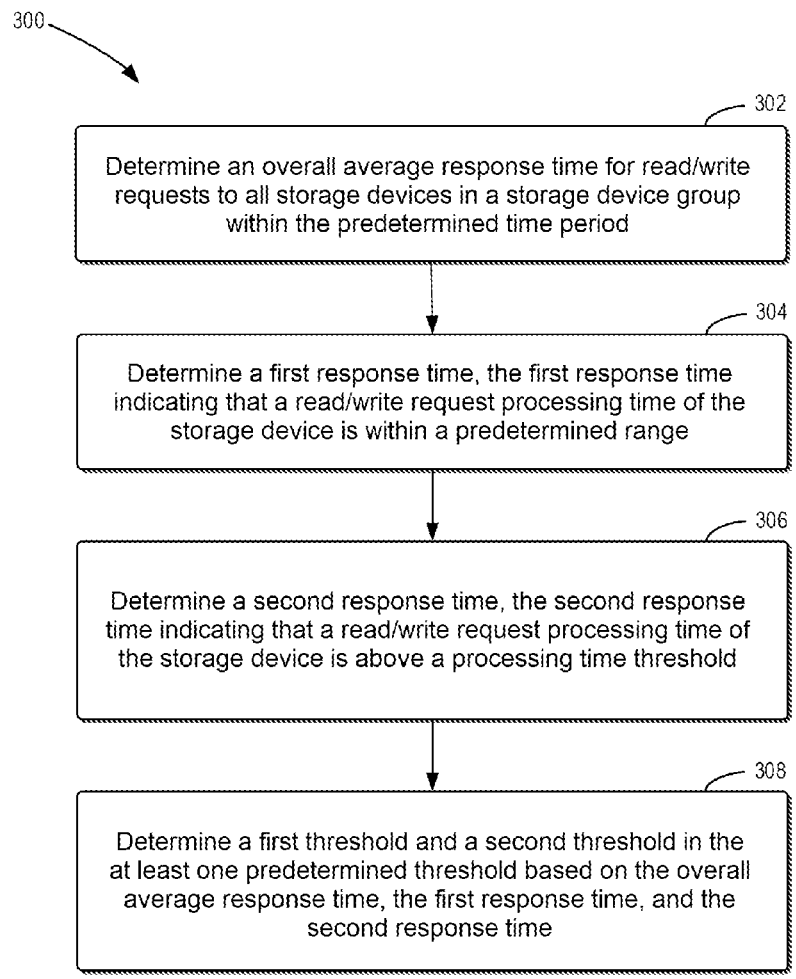
FIG. 3 illustrates a flow chart of an example method of determining a predetermined threshold according to some embodiments of the present disclosure.

FIG. 3 illustrates a flow chart of example method 300 for determining a predetermined threshold according to some embodiments of the present disclosure. Method 300 may be implemented, for example, by storage controller 120 as shown in FIG. 1.

At 302, storage controller 120 determines an overall average response time for read/write requests to all storage devices 111 in storage device group 110 within a predetermined time period. In some embodiments, the overall average response time is determined based on the average response time of each storage device 111 in storage device group 110 and the number of storage devices 111. Since an overall read/write request upper limit of storage device group 110 is also a consideration in the read/write request control, determining the predetermined threshold based on the overall average response time of storage device group 110 can improve the applicability of the determined predetermined threshold.

At 304, storage controller 120 determines a first response time indicating that a read/write request processing time of the storage device is within a predetermined range. In some embodiments, the first response time may be determined using a statistical method based on historical response times of storage device 111. For example, if the processing time of storage device 111 is normal in a long historical period and there is no slow processing, the average response time during this period is determined as the first response time. In such embodiment, by performing statistical analysis on historical data within the long time period, the average response time that accurately indicates the normal operation of the storage device can be determined.

In some embodiments, the first response time may be a normal average response time for a future time period and determined based on a prediction model.

At 306, storage controller 120 determines a second response time indicating that a read/write request processing time of the storage device is above a processing time threshold. In some embodiments, the second response time may be determined using a statistical method based on historical response times of storage device 111. For example, if the processing time of storage device 111 is too long in a long historical time period and the processing is slow, the average response time in this period is determined as the second response time. In some embodiments, the second response time may also be an average response time, which is considered slow, for a future time period and determined based on a prediction model.

At 308, storage controller 120 determines a first threshold and a second threshold in the at least one predetermined threshold based on the overall average response time, the first response time, and the second response time. In some embodiments, the smaller of the overall average response time and the first response time may be selected as the first threshold. Here, the first threshold may represent a lower limit of storage device 111 in a normal working state, that is, if the response time is below the first threshold, it means that storage device 111 has a high speed of processing read/write requests and may process more read/write requests. In some embodiments, the larger of a predetermined multiple of the overall average response time and the second response time is selected as the second threshold. For example, the predetermined multiple may be 1.5, 2, or 2.5. Here, the second threshold may represent an upper limit of storage device 111 in a normal working state, that is, if the response time exceeds the second threshold, it means that the average response time of storage device 111 is long, and a state of slow processing may have occurred. In such embodiment, the determined threshold is made more accurate by comprehensively considering the overall average response time and the response times representing different working states.

Through example method 300 shown in FIG. 3, two thresholds are obtained, so that read/write request processing states of the storage device may be classified more accurately, thereby providing a better reference for subsequent judgment, and further more accurately judging the read/write request processing state of storage device 111.

Returning to FIG. 2, at 206, storage controller 120 adjusts a read/write request upper limit of the storage device based on the comparison between the average response time and the at least one predetermined threshold. Here, the read/write request upper limit indicates the maximum number of read/write requests in a read/write request queue for the storage device. In some embodiments, the at least one predetermined threshold may include one predetermined threshold. In such embodiment, the read/write request upper limit may be decreased when the average response time is above a predetermined threshold, and the read/write request upper limit may be increased when the average response time is below the predetermined threshold. An example method of adjusting the read/write request upper limit will be described in detail below with reference to FIG. 4.

In this way, the read/write request upper limit of a storage device is dynamically adjusted based on a current response time of the storage device for processing read/write requests, and slow read/write processing caused by the accumulation of read/write requests at one storage device can be avoided.

Figure 4:
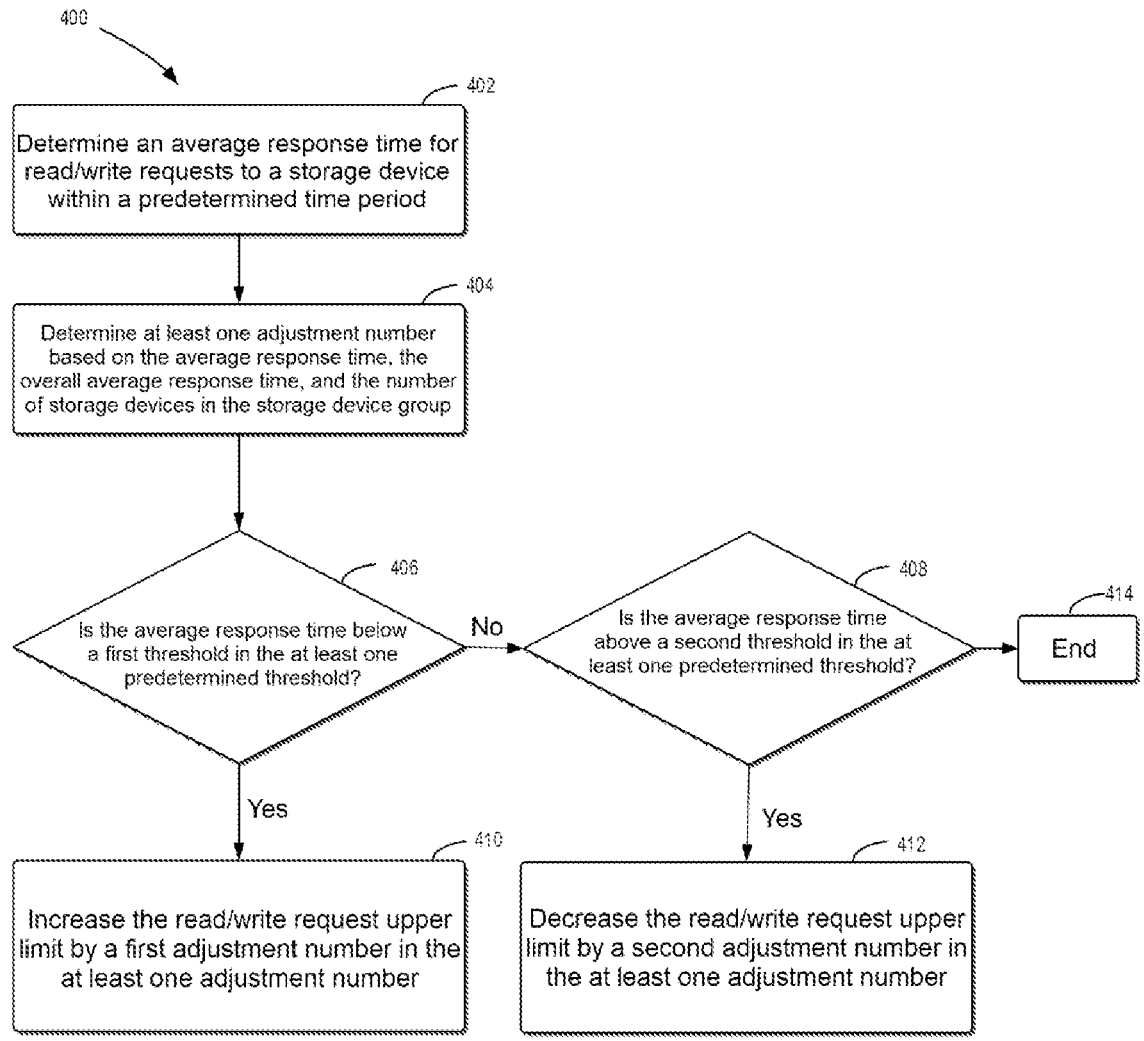
FIG. 4 illustrates a flow chart of an example method of determining an adjustment number according to some embodiments of the present disclosure.

FIG. 4 illustrates a flow chart of example method 400 of adjusting a read/write request upper limit using an adjustment number according to some embodiments of the present disclosure. Method 400 may be implemented, for example, by storage controller 120 as shown in FIG. 1.

At 402, storage controller 120 determines an overall average response time for read/write requests to all storage devices 111 in storage device group 110 within the predetermined time period.

At 404, storage controller 120 determines at least one adjustment number based on the average response time, the overall average response time, and the number of storage devices in the storage device group. In some embodiments, the adjustment number may be determined based on a difference between or quotient of the average response time and the overall average response time as well as the number of storage devices. As mentioned above, the overall read/write request upper limit of storage device group 110 is an important factor. Therefore, determining the adjustment number based on the overall average response time of storage device group 110 can also improve the applicability of the adjustment number.

At 406, storage controller 120 determines whether the average response time is below a first threshold in the at least one predetermined threshold. The first threshold may be, for example, a first threshold obtained by the example method shown in FIG. 3. If the average response time is below the first threshold in the at least one predetermined threshold, method 400 proceeds to 410; and if the average response time is above the first threshold in the at least one predetermined threshold, method 400 proceeds to 410.

At 410, storage controller 120 increases the read/write request upper limit by a first adjustment number in the at least one adjustment number. In some embodiments, the first adjustment number can be determined by the following formula:

$$\delta m = \sum_{i=0}^{N} AvgRT(Di)/(N * AvgRT(Dm)) \quad (2)$$

where δm represents the first adjustment number; $\Sigma_{i=0}^{N}$ AvgRT(Di) represents the sum of average response times of all storage devices 111 in storage device group 110; AvgRT (Dm) represents the average response time of storage device 111; and N represents the number of storage devices 111 in storage device group 110. In some embodiments, before adjusting, storage controller 120 may check whether the adjusted read/write request upper limit is above a predetermined adjustment upper limit. If it is determined to be above the adjustment upper limit, the read/write request upper limit is adjusted to the adjustment upper limit. The adjustment upper limit may be, for example, 150.

At 408, storage controller 120 determines whether the average response time is above a second threshold in the at least one predetermined threshold. The second threshold may be, for example, a second threshold obtained by the example method shown in FIG. 3. If the average response time is above the second threshold in the at least one predetermined threshold, method 400 proceeds to 412; and if the average response time is below the second threshold in the at least one predetermined threshold, method 400 proceeds to 414.

At 412, storage controller 120 decreases the read/write request upper limit by a second adjustment number in the at least one adjustment number.

$$\delta m = N * AvgRT(Dm)/\sum_{i=0}^{N} AvgRT(Di) \quad (3)$$

where $\delta_m$ represents the first adjustment number;

$$\sum_{i=0}^{N} AvgRT(Di)$$

represents the sum of average response times of all storage devices 111 in storage device group 110; AvgRT(Dm) represents the average response time of storage device 111; and N represents the number of storage devices 111 in storage device group 110. In some embodiments, before adjusting, storage controller 120 may check whether the adjusted read/write request upper limit is below a predetermined adjustment lower limit. If it is below the adjustment lower limit, the read/write request upper limit is adjusted to the adjustment lower limit. The adjustment lower limit may be, for example, 60. In such embodiment, with the adjustment limits at this moment, it can be avoided that the adjusted read/write request upper limit is too large or too small to achieve effective adjustment.

At 414, no adjustment is made to the read/write request upper limit, and method 400 ends.

In this way, based on a comparison result with two thresholds and by using correspondingly determined adjustment numbers for adjustment, the read/write request upper limit can be accurately adjusted to a value suitable for the current state, thereby avoiding the accumulation of read/write requests on the one hand, and increasing the utilization rate on the other hand.

Figure 5:
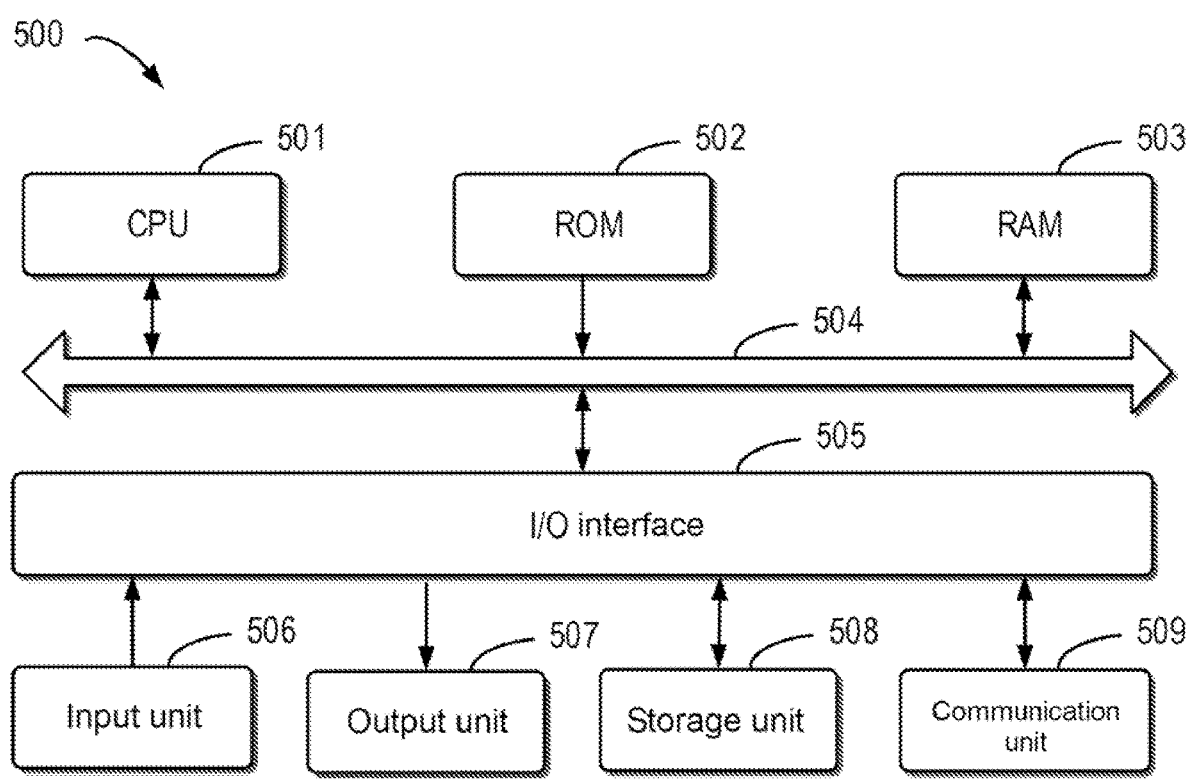
FIG. 5 illustrates a block diagram of an example device that can be used to implement embodiments of the present disclosure.

FIG. 5 illustrates a schematic block diagram of example device 500 that can be used to implement the content of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, for example, methods 200, 300, and 400, can be performed by processing unit 501. For example, in some embodiments, methods 200, 300, and 400 may be implemented as a computer software program that is tangibly included in a machine-readable medium such as storage unit 508. In some embodiments, part of or all the computer program may be loaded and/or installed to device 500 via ROM 502 and/or communication unit 509. When the computer program is loaded to RAM 503 and executed by CPU 501, one or more actions in methods 200 and 700 described above can be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method of processing read/write requests, comprising:
    determining an average response time for read/write requests to a storage device within a predetermined time period;

comparing the average response time with at least one predetermined threshold; and adjusting a read/write request upper limit of the storage device based on the comparison between the average response time and the at least one predetermined threshold, the read/write request upper limit indicating the maximum number of read/write requests in a read/write request queue for the storage device;

wherein the storage device is included in a storage device group; and wherein comparing the average response time with at least one predetermined threshold comprises:

determining an overall average response time for read/write requests to all storage devices in the storage device group within the predetermined time period;

determining the at least one predetermined threshold based on the overall average response time; and comparing the average response time with the determined at least one predetermined threshold.

2. The method according to claim 1, wherein determining the at least one predetermined threshold comprises:

determining a first response time, the first response time indicating that a read/write request processing time of the storage device is within a predetermined range;

determining a second response time, the second response time indicating that the read/write request processing time of the storage device is above a processing time threshold; and determining a first threshold and a second threshold in the at least one predetermined threshold based on the overall average response time, the first response time, and the second response time.

3. The method according to claim 2, wherein determining a first threshold and a second threshold in the at least one predetermined threshold comprises:

selecting the smaller of the overall average response time and the first response time as the first threshold; and selecting the larger of a predetermined multiple of the overall average response time and the second response time as the second threshold.

4. The method according to claim 1, wherein adjusting a read/write request upper limit of the storage device comprises:

determining at least one adjustment number based on the average response time, the overall average response time, and the number of storage devices in the storage device group; and adjusting the read/write request upper limit using the at least one adjustment number.

5. The method according to claim 4, wherein adjusting the read/write request upper limit using the adjustment number comprises:

in response to the average response time being below a first threshold in the at least one predetermined threshold, increasing the read/write request upper limit by a first adjustment number in the at least one adjustment number; and in response to the average response time being above a second threshold in the at least one predetermined threshold, decreasing the read/write request upper limit by a second adjustment number in the at least one adjustment number.

6. The method according to claim 4, wherein determining at least one adjustment number comprises:

determining a candidate adjustment number based on the average response time, the overall average response time, and the number of storage devices in the storage device group;

determining a target read/write request upper limit based on the candidate adjustment number and the read/write request upper limit;

acquiring an adjustment upper limit and an adjustment lower limit of the read/write request upper limit;

in response to the target read/write request upper limit being above the adjustment upper limit, determining the at least one adjustment number based on the adjustment upper limit and the read/write request upper limit; and in response to the target read/write request upper limit being below the adjustment lower limit, determining the at least one adjustment number based on the adjustment lower limit and the read/write request upper limit.

7. An electronic device, comprising:

a processor; and a memory coupled to the processor, wherein the memory has instructions stored therein, and the instructions, when executed by the processor, cause the device to execute actions comprising:

determining an average response time for read/write requests to a storage device within a predetermined time period;

comparing the average response time with at least one predetermined threshold; and adjusting a read/write request upper limit of the storage device based on the comparison between the average response time and the at least one predetermined threshold, the read/write request upper limit indicating the maximum number of read/write requests in a read/write request queue for the storage device;

wherein the storage device is included in a storage device group; and wherein comparing the average response time with at least one predetermined threshold comprises:

determining an overall average response time for read/write requests to all storage devices in the storage device group within the predetermined time period;

determining the at least one predetermined threshold based on the overall average response time; and comparing the average response time with the determined at least one predetermined threshold.

8. The electronic device according to claim 7, wherein determining the at least one predetermined threshold comprises:

determining a first response time, the first response time indicating that a read/write request processing time of the storage device is within a predetermined range;

determining a second response time, the second response time indicating that the read/write request processing time of the storage device is above a processing time threshold; and determining a first threshold and a second threshold in the at least one predetermined threshold based on the overall average response time, the first response time, and the second response time.

9. The electronic device according to claim 8, wherein determining a first threshold and a second threshold in the at least one predetermined threshold comprises:

selecting the smaller of the overall average response time and the first response time as the first threshold; and selecting the larger of a predetermined multiple of the overall average response time and the second response time as the second threshold.

10. The electronic device according to claim 7, wherein adjusting a read/write request upper limit of the storage device comprises:
  determining at least one adjustment number based on the average response time, the overall average response time, and the number of storage devices in the storage device group; and
  adjusting the read/write request upper limit using the at least one adjustment number.

11. The electronic device according to claim 10, wherein adjusting the read/write request upper limit using the at least one adjustment number comprises:
  in response to the average response time being below a first threshold in the at least one predetermined threshold, increasing the read/write request upper limit by a first adjustment number in the at least one adjustment number; and
  in response to the average response time being above a second threshold in the at least one predetermined threshold, decreasing the read/write request upper limit by a second adjustment number in the at least one adjustment number.

12. The electronic device according to claim 10, wherein determining at least one adjustment number comprises:
  determining a candidate adjustment number based on the average response time, the overall average response time, and the number of storage devices in the storage device group;
  determining a target read/write request upper limit based on the candidate adjustment number and the read/write request upper limit;
  acquiring an adjustment upper limit and an adjustment lower limit of the read/write request upper limit;
  in response to the target read/write request upper limit being above the adjustment upper limit, determining the at least one adjustment number based on the adjustment upper limit and the read/write request upper limit; and
  in response to the target read/write request upper limit being below the adjustment lower limit, determining the at least one adjustment number based on the adjustment lower limit and the read/write request upper limit.

13. A computer program product having a non-transitory computer readable medium which stores a set of instructions to process read/write requests; the set of instructions, when carried out by computerized circuitry, causing the computerized circuitry to perform a method of:
  determining an average response time for read/write requests to a storage device within a predetermined time period;
  comparing the average response time with at least one predetermined threshold; and
  adjusting a read/write request upper limit of the storage device based on the comparison between the average response time and the at least one predetermined threshold, the read/write request upper limit indicating the maximum number of read/write requests in a read/write request queue for the storage device;
  wherein the storage device is included in a storage device group; and
  wherein comparing the average response time with at least one predetermined threshold comprises:
    determining an overall average response time for read/write requests to all storage devices in the storage device group within the predetermined time period;
    determining the at least one predetermined threshold based on the overall average response time; and
    comparing the average response time with the determined at least one predetermined threshold.

14. The computer program product according to claim 13, wherein determining the at least one predetermined threshold comprises:
  determining a first response time, the first response time indicating that a read/write request processing time of the storage device is within a predetermined range;
  determining a second response time, the second response time indicating that the read/write request processing time of the storage device is above a processing time threshold; and
  determining a first threshold and a second threshold in the at least one predetermined threshold based on the overall average response time, the first response time, and the second response time.

15. The computer program product according to claim 14, wherein determining a first threshold and a second threshold in the at least one predetermined threshold comprises:
  selecting the smaller of the overall average response time and the first response time as the first threshold; and
  selecting the larger of a predetermined multiple of the overall average response time and the second response time as the second threshold.

16. The computer program product according to claim 13, wherein adjusting a read/write request upper limit of the storage device comprises:
  determining at least one adjustment number based on the average response time, the overall average response time, and the number of storage devices in the storage device group; and
  adjusting the read/write request upper limit using the at least one adjustment number.

17. The computer program product according to claim 16, wherein adjusting the read/write request upper limit using the adjustment number comprises:
  in response to the average response time being below a first threshold in the at least one predetermined threshold, increasing the read/write request upper limit by a first adjustment number in the at least one adjustment number; and
  in response to the average response time being above a second threshold in the at least one predetermined threshold, decreasing the read/write request upper limit by a second adjustment number in the at least one adjustment number.

18. A method of processing read/write requests, comprising:
  determining an average response time for read/write requests to a storage device within a predetermined time period;
  comparing the average response time with at least one predetermined threshold; and
  adjusting a read/write request upper limit of the storage device based on the comparison between the average response time and the at least one predetermined threshold, the read/write request upper limit indicating the maximum number of read/write requests in a read/write request queue for the storage device;
  wherein the storage device is included in a storage device group, and wherein adjusting a read/write request upper limit of the storage device comprises:

determining an overall average response time for read/write requests to all storage devices in the storage device group within the predetermined time period;

determining at least one adjustment number based on the average response time, the overall average response time, and the number of storage devices in the storage device group; and adjusting the read/write request upper limit using the at least one adjustment number.

19. The method according to claim 18, wherein adjusting the read/write request upper limit using the adjustment number comprises:

in response to the average response time being below a first threshold in the at least one predetermined threshold, increasing the read/write request upper limit by a first adjustment number in the at least one adjustment number; and in response to the average response time being above a second threshold in the at least one predetermined threshold, decreasing the read/write request upper limit by a second adjustment number in the at least one adjustment number.

20. The method according to claim 18, wherein determining at least one adjustment number comprises:

determining a candidate adjustment number based on the average response time, the overall average response time, and the number of storage devices in the storage device group;

determining a target read/write request upper limit based on the candidate adjustment number and the read/write request upper limit;

acquiring an adjustment upper limit and an adjustment lower limit of the read/write request upper limit;

in response to the target read/write request upper limit being above the adjustment upper limit, determining the at least one adjustment number based on the adjustment upper limit and the read/write request upper limit; and in response to the target read/write request upper limit being below the adjustment lower limit, determining the at least one adjustment number based on the adjustment lower limit and the read/write request upper limit.

* * * * *